Patented July 21, 1942

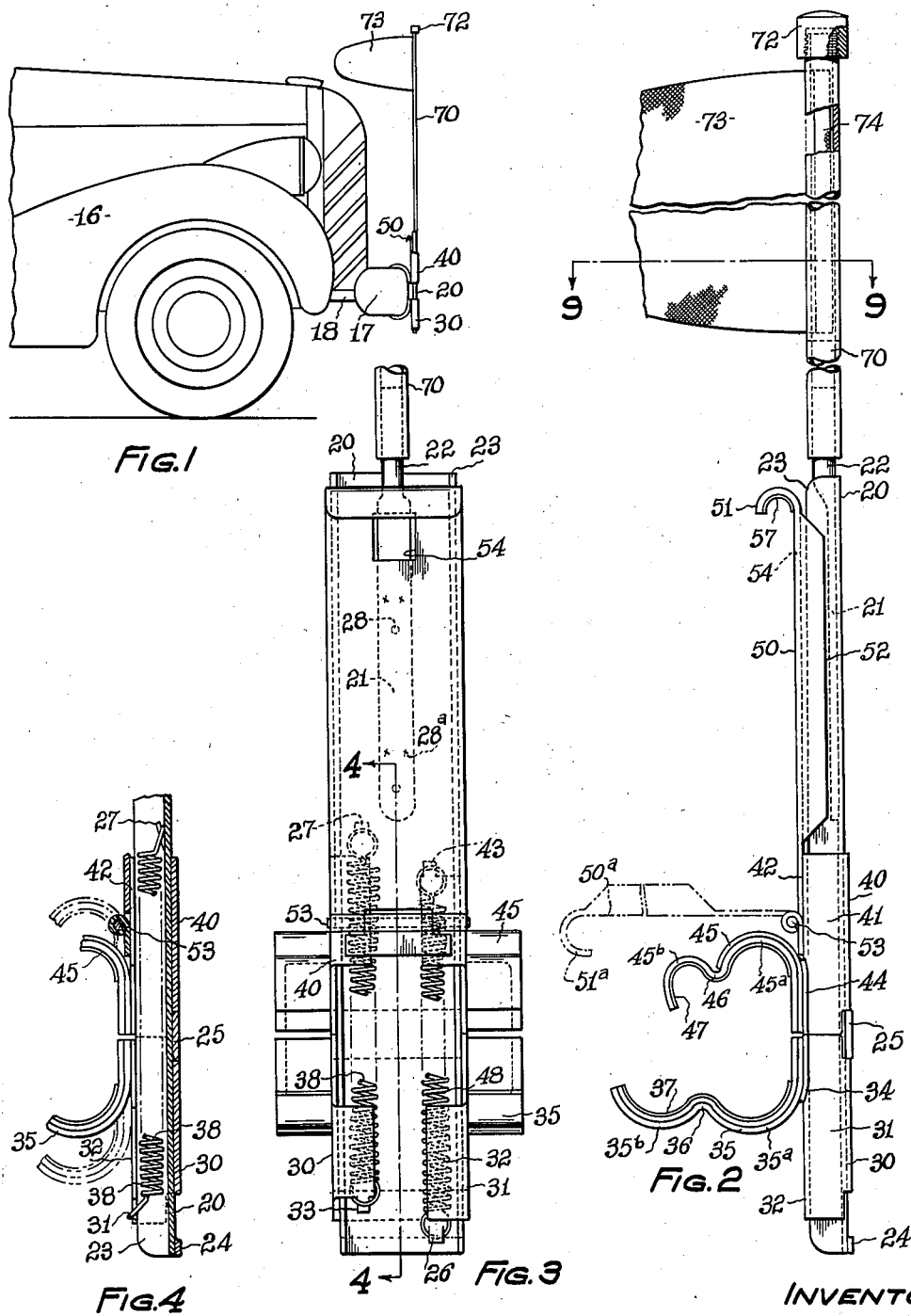

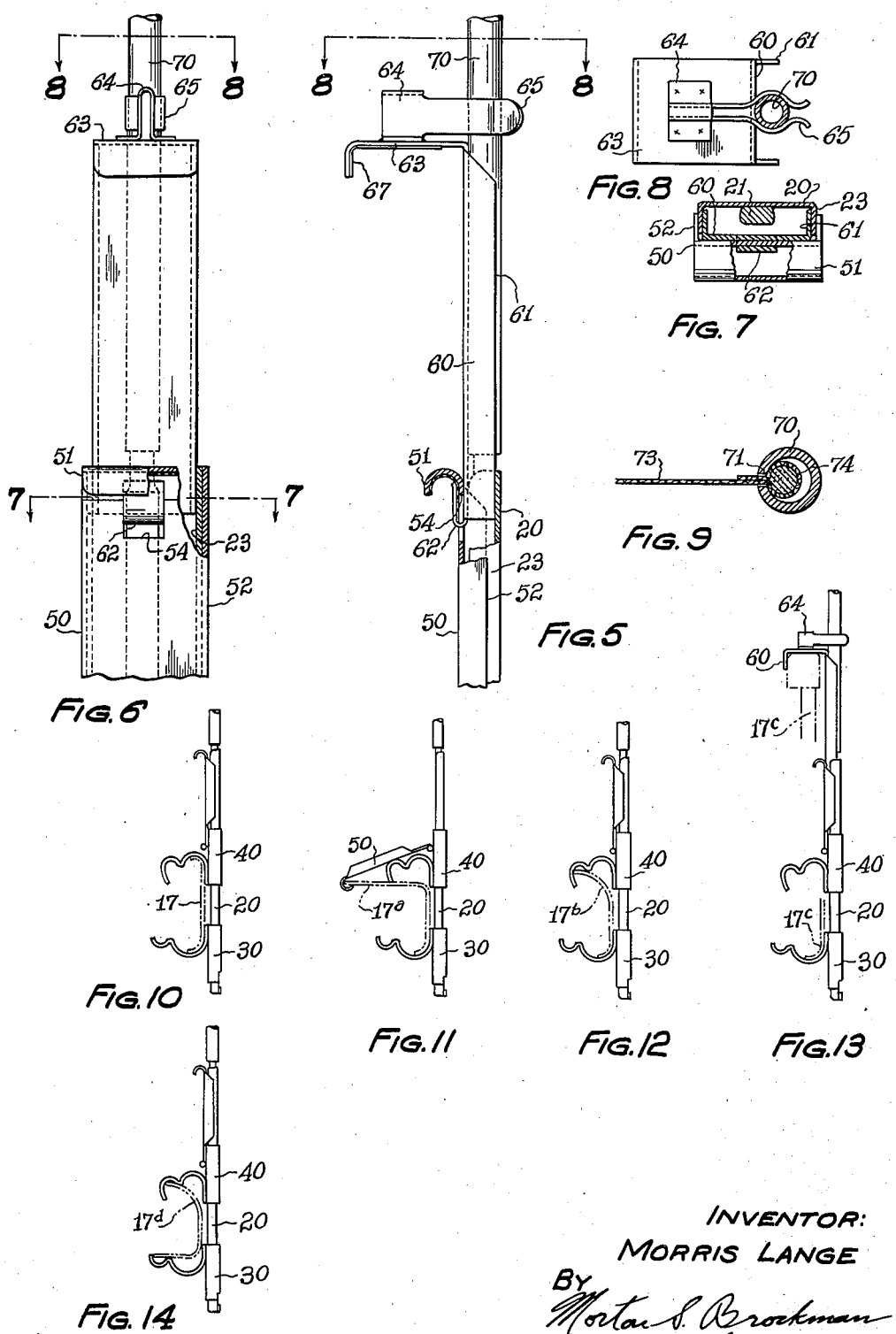

2,290,645

UNITED STATES PATENT OFFICE 2,290,645

FLAG HOLDER

Morris Lange, Cleveland Heights, Ohio

Application January 2, 1941, Serial No. 372,746

3 Claims. (Cl. 248—43)

This invention relates to universal flag or banner supports and particularly to the type which may be quickly and easily attached to or removed from the bumpers of various styles and different makes of automobiles.

As conducive to a clearer understanding of this invention, it may be well to point out that flag holders of the prior art were limited for use on practically one style of automobile bumper. For example, in the reissued Patent No. 21,056 to Boskett on April 25, 1939, a flag holder is illustrated which is adaptable for use on a front bumper of an automobile, but which bumper is substantially straight in cross-section and is spaced forward from the vehicle proper. That particular holder cannot be satisfactorily fitted to an irregularly curved bumper or to one equipped with a raised grille guard. Many of the automobiles manufactured since the aforesaid Boskett invention are provided with bumpers which are irregular in cross-section. Some of the modern bumpers are oddly curved. Others have straight horizontal portions extending rearwardly therefrom, and also, most of the modern automobiles are provided with a metal piece known as a pebble guard which completely closes the space between the front of the automobile radiator and the bumper. This prohibits the use of an attachment which fits or clamps onto the inside or rear surface of the bumper.

It is therefore the primary object of this invention to provide a staff holder with a clamp means which is engageable with different automobile bumpers having various shapes, sizes or designs.

Another object of the invention is to provide a flag attachment which quickly engages the front or outside portions of the bumper member.

A further object is to provide a device of the type mentioned with a banner holding means which permits it to be easily removed for washing or replacement.

These and other objects and features of the invention will become apparent from a study of the following description and claims together with the accompanying drawings in which like parts are designated by like reference characters and wherein:

Figure 1 is a side elevation of the front of an automobile equipped with a flag holder constructed in accordance with my invention;

Figure 2 is an enlarged side view of the flag holder;

Figure 3 is a front view of the flag holder jaw members;

Figure 4 is a vertical sectional view of the jaw members taken along the lines 4—4 of the Figure 3;

Figure 5 is a side elevation of an auxiliary or extension member attached to the device for making it adaptable to bumpers equipped with radiator grille guards;

Figure 6 is a front view of the member shown in the Figure 5;

Figure 7 is a horizontal sectional view taken along the lines 7—7 of the Figure 6;

Figure 8 is a horizontal sectional view taken along the lines 8—8 of the Figures 5 and 6, particularly showing a spring clip on the expanded jaw portion;

Figure 9 is a cross-sectional view of the flag staff and banner taken along the lines 9—9 of the Figure 1;

Figure 10 is a view of the device illustrating the method of mounting it on a conventional straight bumper;

Figure 11 is a similar view showing method of mounting the device on a straight bumper that has an extremely long horizontal ledge extending rearwardly therefrom;

Figure 12 is a similar view showing method of mounting the device on a curved bumper;

Figure 13 is a similar view showing method of attaching the device to a bumper having a radiator grille guard extending upwardly therefrom; and Figure 14 is a similar view showing method of mounting the holder on a curved bumper having a wide flat horizontal bar.

The instant invention consists primarily of four distinct elements, each of which will be described in detail hereinafter. There is first the support member 20; secondly, the bottom jaw member 30; third, the top jaw member 40; and finally, the top cloth banner holding member 70.

The comprehensive view of Figure 1 shows the instant device mounted on a base shown as a front bumper 17 of an automobile 16. The automobile 16, as illustrated, has a horizontal and laterally extending pebble guard 18 which closes the space between the radiator and the bumper 17. The bumper shown in the figure has a vertical cross-section somewhat like that illustrated in the Figure 10. The Figures 11, 12, 13, and 14 show in broken lines bumper cross-sections of different types which the instant invention is intended to accommodate. In the aforesaid figures, the different styles of bumpers are indicated by the characters 17a, 17b, 17c, and 17d. The method of mounting the device on the different bumpers will be more clearly understood from a reading of the following detailed description.

The support member 20 consists of a length of metal approximately ten inches long and an inch and one-half wide and has two parallel longitudinal flanges 23 on each side edge thereof. The flanges are about one-half inch wide. A flag staff retaining means 21 is rigidly attached to or otherwise mounted on the inside of the support member 20 midway between the two longitudinal flanges 23. In Figure 3 of the drawings, the lower flattened portion of the retaining means 21 is attached to the support member by a series of rivets and welds 28 and 28a respectively. The top rounded portion 22 of the staff retaining means 21 is simply a short lug which projects above the top edge of the support so that the tubular flag staff 70 can be conveniently mounted thereon. At the extreme lower edge of the support 20, there is attached a small piece of metal 24 which serves as an abutment or stop for the bottom jaw 30 which will be hereinafter described. A short distance above the stop 24 there is attached a second stop 25 which serves as an abutment for both the lower and upper jaws 30 and 40 respectively.

The first or bottom jaw member 30 is simply a collar-like member which is rectangular in cross-section and which fits around and slides on the support member 20 between the two stops 24 and 25. Specifically, it consists of a flat piece of metal which is contiguous to the flat portion of the support member 20, and two flanged portions 31 which are contiguous to the flange portions 23, and two inwardly turned cover portions 32 which are folded over the edges of the flanges 23 so that they almost meet but which do not quite touch each other. A small plate portion 34 is mounted laterally across the cover portions 32 so as to close the opening therebetween. On this plate portion 34 there is mounted the eccentric bottom clamp 35. The clamp 35 is somewhat W in shape and has two curved laterally extending channels 35a and 35b, each of which engages the lower edge of some one of the different types of bumpers. A central ridge 36 divides the channels 35a and 35b so as to make each channel an independent gripping means. A small sheet of rubber or some other protective covering 37 is firmly attached to the inside of the contacting surface of the bottom clamp 35 in order to protect the finish of the base on which the holder is mounted. A contractile spring 38 is mounted inside the support member between its flanges 23 and within the bottom jaw portion 30 so that the bottom jaw is urged upwardly toward the stop 25. In order to mount the spring 38, one of the cover portions 32 of the bottom jaw is provided with a small tab 33, and the support member 20 has a recessed ear about half way between the ends thereof. The contractile spring 38 has end loops which engage the said tab 33 and ear 27 in the manner clearly shown in the Figures 3 and 4.

The top or second jaw 40 reciprocates or coacts with the first jaw 30 and is very similar in construction except that its elements are inverted. It too has a flat portion adjacent to the back of the support member 20, has vertical flanges 41 and cover portions 42 which engage the flanges 23. It likewise has a plate portion 44 on which there is firmly mounted the eccentric clamp 45. The clamp 45 is substantially M shape in cross-section and has an inside channel 45a and an outside channel 45b which are separated by the ridge 46. A similar protective rubber covering 47 is cemented to the bottom or inside surfaces of the clamp portions as shown in the Figure 2. The contractile spring 48 is attached to the support member 20 at its lower end by the recessed ear 26 and is attached to the top jaw 40 at its upper end by the projecting tab 43. The spring 48 lies alongside of the spring 38 between the vertical flanges 23, 31 and 41.

In order to provide for automobile bumpers which have unusually wide top ledges, the top jaw 40 has hinged thereto a third clamp portion also referred to as a flexible elongated jaw 50. This third jaw 50 consists of a flat plate portion which is hingedly connected to the plate 44 at the point 53. It lies across the top edges of the two parallel flanges 23 and also has a pair of forwardly extending flanges 52 which closely engage and fit the outside surface of the aforesaid flanges 23. The Figure 2 shows in broken lines and indicates by the character 50a the alternate position of the extension clamp 50. The Figure 11 shows generally how this third clamp portion 50 hingedly mounted on the top jaw 40 engages a bumper 17a. The hook portion 51 of the flexible jaw also has a protective rubber cover 57 on the inside surface.

Inasmuch as some automobiles are equipped with bumpers that also have rather high grille guards or fancy license plate holders which prohibit the use of conventional flag holders, a fourth jaw member or extension clamp is provided for the device in order to accommodate such bumpers of extreme or unusual design. This extension clamp 60 consists of a length of flat metal slightly narrower than the support member 20. It has two parallel flanges 61 thereon for the purpose of making it more rigid and for lending strength thereto. It has a top hook or clamp member 63 which extends rearwardly thereof as indicated in the Figures 6, 7 and 12. Like on the other clamps described, a rubber protective covering 67 is attached to the inside surface of the clamp and engages the top horizontal bar of the grille guard 17c.

The bottom of the extension clamp 60 has a small hook 62 which fits into the top central hole 54 of the elongated jaw 50 as is shown in the Figures 5, 6 and 7. The top of the clamp 63 is provided with a clip 64 which has curved spring portions 65 which snap on to and engage the flag staff 70 as is shown in the Figures 5, 6 and 12.

The top of the tubular staff 70 has a longitudinal split 71 which is slightly longer than the width of the cloth banner 73. The cloth banner 73 has a bead or welt portion 74 along one vertical edge thereof which portion fits into the tubular portion of the staff so that the flat cloth adjacent thereto will extend outwardly through the split 71. This bead or welt is easily made by making a small hem and inserting a heavy cord or piece of rope therein. The extreme top of the staff 70 is threaded so as to receive the threaded knob 72 in any suitable manner which prevents the accidental or unintentional removal of the flag 73. The threaded top and ornamental knob are shown in detail in the Figure 2 of the drawings.

One of the important advantages that this device has over prior art devices is that it can be mounted quickly and easily and in most instances single handedly, and while the staff is substantially in a vertical position. At this point attention should be called to the fact that flag holders of this type have their greatest use at funerals. As a rule, the person attaching them carries several holders in one hand and walks rapidly along the line of cars before the procession starts and quickly snaps or mounts a flag holder on each vehicle in the procession. At such times the automobiles are quite close together and the space between the front and rear bumpers is not very great; therefore this crowding naturally makes the mounting of the flag holder more difficult than otherwise and especially so when it would have to be tipped or manipulated at different angles before it is properly or securely attached. Practically the same conditions prevail when the ceremony is over and the holders are to be detached. It is therefore apparent that flag holders of this type should be so constructed that they can be readily mounted or demounted under unusual conditions and by one person using one hand only so that the other hand is free to hold the rest of them. The particular construction of the instant invention and the novel feature of the two movable jaw members makes this device superior to those of the prior art for the reasons stated.

It will now be clear that there is provided by this invention a flag holder which accomplishes the objects of the invention. While the invention has been illustrated in its preferred form and while certain special terms have been used to describe it, it is to be understood that the embodiment of the invention as described and illustrated herein is not to be considered in a limiting sense as there are many other forms or modifications of the invention which are also considered to be within the scope of the appended claims.

I claim:

1. A display device, comprising in combination, a vertical support member having a flag staff retaining means thereon, separable first and second aligned jaw portions mounted substantially horizontally on the said support member, a tension means mounted on the support member and connected to the said jaw portions in a manner urging them together to secure the device to a base, and a third jaw portion hingedly mounted on the first jaw portion and adapted to cooperate with the second jaw portion when aligned substantially horizontal therewith and engageable with the vertical support member when vertically aligned therewith.

2. A display device, comprising in combination, a vertical support member having a flag staff retaining means thereon, a first jaw member having a first clamp portion thereon slidably mounted on the support member, a second jaw member having a second clamp portion thereon slidably mounted on the said support member, a tension means mounted on the support member for each of the jaw members and connected thereto in a manner urging them together to secure the device to a base, and an extendable clamp member mounted on the first jaw member and substantially aligned with the said first clamp portion and adapted to cooperate with the said second clamp portion.

3. A display device, comprising in combination a vertical support member having a flag staff retaining means thereon, a first jaw member having a substantially M shaped clamp portion thereon mounted on the support member, a second jaw member having a substantially W shaped clamp portion thereon mounted on the support member in a position opposite the first jaw member causing the open parts of the said clamp portions to face each other, spring means mounted on the support member for each of the jaw members and connected thereto in a manner urging them together to secure the device to a base and a clamp member connected to the first jaw member overlying the M shaped clamp portion and adapted to cooperate with the said W shaped clamp portion to prevent tipping of the device on the said base.

MORRIS LANGE.